United States Patent
Yeager et al.

(10) Patent No.: US 7,290,280 B2
(45) Date of Patent: Oct. 30, 2007

(54) METHOD AND APPARATUS TO FACILITATE VIRTUAL TRANSPORT LAYER SECURITY ON A VIRTUAL NETWORK

(75) Inventors: William J. Yeager, Menlo Park, CA (US); Rita Y. Chen, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 902 days.

(21) Appl. No.: 10/117,819

(22) Filed: Apr. 8, 2002

(65) Prior Publication Data

US 2003/0191965 A1    Oct. 9, 2003

(51) Int. Cl.
*H04L 9/00*   (2006.01)
*H04K 1/00*   (2006.01)
*G06F 15/16*  (2006.01)

(52) U.S. Cl. .................. 726/14; 713/175; 713/176; 709/227; 709/230

(58) Field of Classification Search .................. None
See application file for complete search history.

(56) References Cited

U.S. PATENT DOCUMENTS

| | | | | |
|---|---|---|---|---|
| 6,061,796 A * | 5/2000 | Chen et al. | .................... | 726/15 |
| 6,158,011 A * | 12/2000 | Chen et al. | .................... | 726/15 |
| 6,584,567 B1 * | 6/2003 | Bellwood et al. | ........... | 713/171 |
| 7,065,579 B2 * | 6/2006 | Traversat et al. | ........... | 709/230 |
| 7,127,613 B2 * | 10/2006 | Pabla et al. | ................. | 713/171 |
| 7,136,927 B2 * | 11/2006 | Traversat et al. | ........... | 709/230 |
| 7,167,920 B2 * | 1/2007 | Traversat et al. | ........... | 709/230 |
| 7,197,565 B2 * | 3/2007 | Abdelaziz et al. | .......... | 709/226 |
| 7,203,753 B2 * | 4/2007 | Yeager et al. | ............... | 709/225 |
| 7,213,047 B2 * | 5/2007 | Yeager et al. | ............... | 709/202 |
| 7,222,187 B2 * | 5/2007 | Yeager et al. | ............... | 709/237 |

OTHER PUBLICATIONS

Aberer et al, "Managing Trust in a Peer-2-Peer Information System", Nov. 2001, Department of Communication Systems Swiss Federal Institute of Technology, p. 310-317.*
"Project JXTA: Technical Shell Overview", Apr. 25, 2001, Sun Microsystems, Inc., p. 1-11.*
Krishnan, "The JXTA Solution to P2P", Oct. 19, 2001, Javaworld.com, p. 1-12.*

(Continued)

*Primary Examiner*—Christopher Revak
(74) *Attorney, Agent, or Firm*—Park, Vaughan & Fleming LLP

(57) ABSTRACT

One embodiment of the present invention provides a system that provides virtual transport layer security on a virtual network to facilitate peer-to-peer communications. The system creates a first pipe that functions as a one-way input channel into a first peer. Next, the system associates a first peer identifier with the first pipe and advertises the availability of this first pipe. A second peer connects to this first pipe to communicate with the first peer. The system also creates a second pipe at the second peer, and a second peer identifier is associated with this second pipe. The first peer connects to this second pipe to communicate with the second peer. The first pipe and the second pipe form a virtual connection through which the first peer and the second peer can communicate securely.

21 Claims, 3 Drawing Sheets

OTHER PUBLICATIONS

Callan et al, "Peer-to-Peer Networks for Self-Organizing Virtual Communities", Jul. 2001, NSF Proposal IIS-0118767, p. 1-16.*

Kawahara et al, "A Peer-to-Peer Exchange Scheme for Large Scale Networked Virtual Environments", 2002, IEEE, p. 957-961.*

Gong et al, "JXTA: A Network Programming Environment", May/Jun. 2001, IEEE Internet Computing, p. 88-95.*

Traversat et al, "Project JXTA 2.0 Super-Peer Virtual Network", May 25, 2003, Sun Microsystems Inc., p. 1-20.*

"Protect JXTA: An Open, Innovative Collaboration", Apr. 25, 2001, Sun Microsystems Inc., p. 1-7.*

* cited by examiner

METHOD AND APPARATUS TO FACILITATE VIRTUAL TRANSPORT LAYER SECURITY ON A VIRTUAL NETWORK

BACKGROUND

1. Field of the Invention

The present invention relates to providing security in communications involving computer systems. More specifically, the present invention relates to a method and an apparatus to facilitate virtual transport layer security on a virtual network.

2. Related Art

As computer systems continue to proliferate, designers have established many methods to facilitate communication among these computer systems. Recent attention has been focused on peer-to-peer communications on a virtual network. One example of these peer-to-peer virtual networks is Project JXTA, originally proposed by Sun Microsystems, Inc. of Palo Alto, Calif. Project JXTA and other virtual networks are designed to work with a multitude of underlying protocols that may not include robust transport facilities such as TCP/IP.

Establishing secure communications on these virtual networks can also be challenging because there may be no public key infrastructure (PKI) for establishing cryptographic session keys. Even when a PKI is available, many peers on the virtual network might not require the extremely high level of security associated with the PKI and therefore may not want to incur the costs associated with obtaining a PKI certificate. These peer-to-peer virtual networks do, however, require some level of security within a closed group of peers. This level of security needs only sufficient strength to provide protection for the data being transferred between peers.

Peer-to-peer communications on the virtual network may not be reliable because there is no mechanism to guarantee delivery of all parts of the message or to guarantee the proper order of received records. Since peer-to-peer communications on a virtual network are not reliable, messages that have been encrypted may not be readable at the destination. Dropping or changing one bit of a message may cause the rest of that message to be undecipherable.

What is needed is a method and an apparatus to facilitate virtual transport layer security on a virtual network without the problems listed above.

SUMMARY

One embodiment of the present invention provides a system that provides virtual transport layer security on a virtual network to facilitate peer-to-peer communications. The system creates a first pipe that functions as a one-way input channel into a first peer. Next, the system associates a first peer identifier with the first pipe and advertises the availability of this first pipe. A second peer connects to this first pipe to communicate with the first peer. The system also creates a second pipe at the second peer, and a second peer identifier is associated with this second pipe. The first peer connects to this second pipe to communicate with the second peer. The first pipe and the second pipe form a virtual connection through which the first peer and the second peer can communicate securely.

In one embodiment of the present invention, the system creates a first set of pipes including the first pipe at the first peer. This first set of pipes is associated with the first peer identifier. The system also creates a second set of pipes including the second pipe at the second peer. This second set of pipes is associated with the second peer identifier. The second peer connects to the first set of pipes and the first peer connects to the second set of pipes. The first set of pipes and the second set of pipes provide bi-directional communication over the virtual connection.

In one embodiment of the present invention, the system establishes a first certificate authority at the first peer and a second certificate authority at the second peer. These certificate authorities can issue certificates that facilitate privacy, authentication, integrity, and non-repudiation.

In one embodiment of the present invention, the system encrypts data that is transferred across the virtual connection.

In one embodiment of the present invention, the system encrypts the data using an available encryption engine.

In one embodiment of the present invention, the system uses an available secure hash function to generate a message authentication code to provide message integrity.

In one embodiment of the present invention, the system advertises the availability of the first pipe by registering the first pipe with a rendezvous.

DEFINITIONS

Pipe: A project JXTA pipe—not to be confused with a UNIX pipe, which is a different type of object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Peer-to-Peer Coupling

Figure 1:
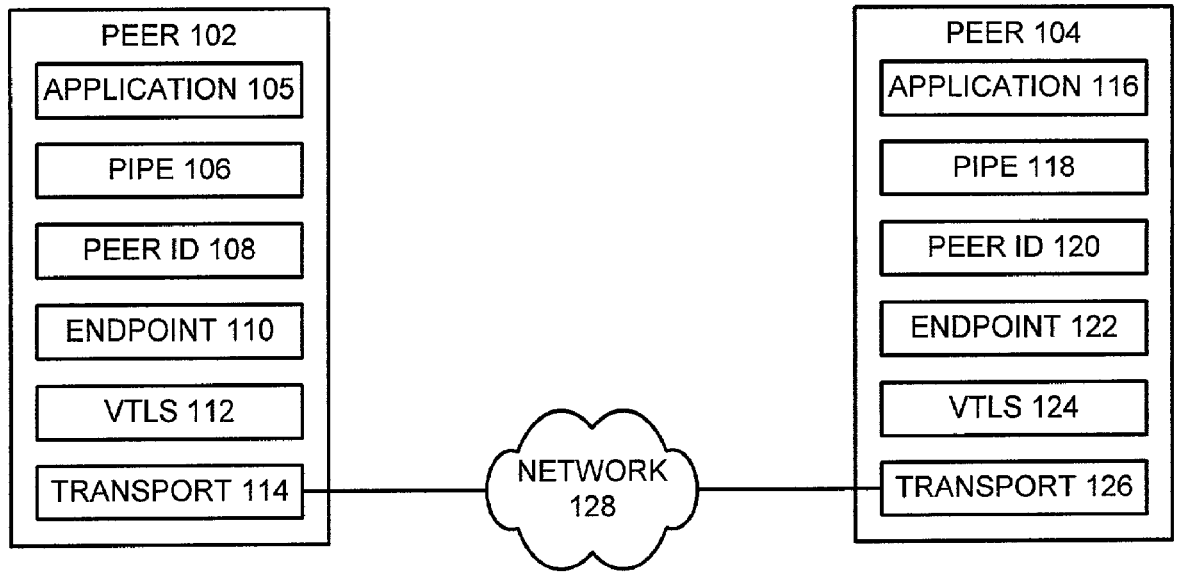
FIG. 1 illustrates peers coupled together through a network in accordance with an embodiment of the present invention.

FIG. 1 illustrates peers coupled together across a network in accordance with an embodiment of the present invention. Peer 102 and peer 104 are coupled together by network 128. Peer 102 and peer 104 can generally include any type of computer system, including, but not limited to, a computer system based on a microprocessor, a mainframe computer, a digital signal processor, a portable computing device, a personal organizer, a device controller, and a computational engine within an appliance.

Network 128 can generally include any type of wire or wireless communication channel capable of coupling together computing nodes. This includes, but is not limited to, a local area network, a wide area network, or a combination of networks. In one embodiment of the present invention, network 128 includes the Internet.

Peer 102 includes application 105, pipe 106, peer ID 108, endpoint 110, virtual transport layer security (VTLS) 112, and transport 114. Peer 104 includes application 116, pipe 118, peer ID 120, endpoint 122, VTLS 124, and transport 126. In operation, application 116 first creates pipe 118 to allow input communications. Next, application 116 associates pipe 118 with peer ID 120 and advertises the availability of pipe 118 as described below in conjunction with FIG. 3. Note that application 116 can create multiple pipes.

Endpoint 122 provides multiplexing services for both input pipes and output pipes as described below in conjunction with FIG. 2. VTLS 124 provides secure communications with VTLS 112 by creating a virtual connection with VTLS 112 as described below in conjunction with FIGS. 2 and 4. Transport 126 provides communication across network 128 to transport 114.

Transports 126 and 114 can be any available transport that is useful on network 128 such as TCP/IP. However, since VTLS 112 and 124 provide end-to-end security and reliability, transports 126 and 114 do not require robust transport services such as TCP/IP.

Application 105 can connect with pipe 118 to send messages to application 116. Additionally, application 105 can create pipe 106 to provide an input channel for application 116 to send messages to application 105. Application 105 associates peer ID 108 with pipe 106. Endpoint 110 provides multiplexing services for both input pipes and output pipes communicating with application 105.

Virtual Connection

Figure 2:
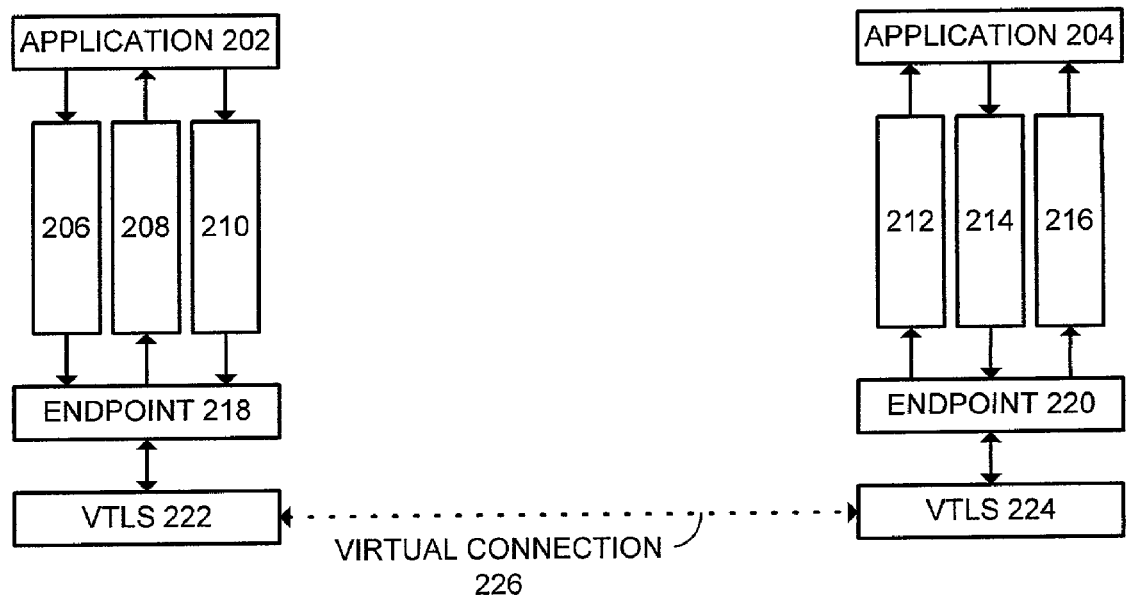
FIG. 2 illustrates a virtual connection between peers in accordance with an embodiment of the present invention.

FIG. 2 illustrates a virtual connection between peers in accordance with an embodiment of the present invention. VTLS 222 and VTLS 224 establish virtual connection 226 using an underlying transport layer as described above in conjunction with FIG. 1. VTLS 222 and VTLS 224 provide robust communications and communication security for communications between application 202 and application 204.

Application 204 has created input pipes 212 and 216 while application 202 has created input pipe 208. These applications have advertised their respective input pipes as available. Endpoint 218 couples input pipe 208 and output pipes 206 and 210 to VTLS 222 and endpoint 220 couples input pipes 212 and 216 and output pipe 214 to VTLS 224.

Application 202 has accessed input pipes 212 and 216 from application 204 as output pipes 206 and 210, while application 204 has accessed input pipe 208 from application 202 as output pipe 214. These pipes share virtual connection 226, thereby amortizing the connection costs across multiple pipes.

Network Layering

Figure 3:
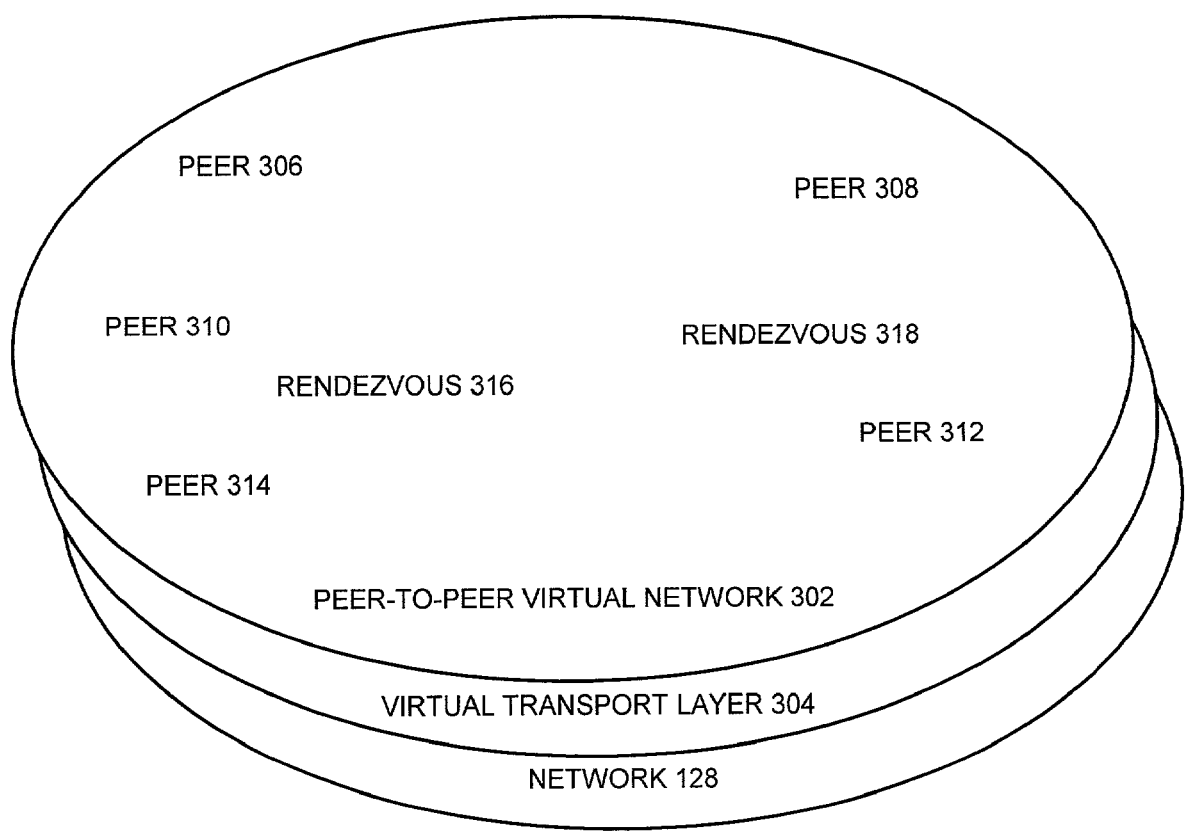
FIG. 3 illustrates network layering in accordance with an embodiment of the present invention.

FIG. 3 illustrates network layering in accordance with an embodiment of the present invention. The system includes peer-to-peer virtual network 302, virtual transport layer 304, and network 128. Network 128 can be any type of network as described above in conjunction with FIG. 1. Virtual transport layer 304 includes VTLS 222 and VTLS 224, and virtual connection 226. Virtual transport layer 304 provides security and reliability for communications between peers.

Peer-to-peer virtual network 302 includes peers 306, 308, 310, 312, and 314, and rendezvous 316 and 318. Note that there may be more or less peers and rendezvous than shown. A peer wishing to receive communications, say peer 308, creates a pipe and associates the pipe with the peer ID. Next, peer 308 advertises the pipe as available by registering the pipe with a rendezvous, say rendezvous 318. Another peer wishing to communicate with peer 308, say peer 314, searches for an available pipe by referring to the pipes that have been registered with rendezvous 316 or 318. Upon locating an available pipe for communicating with peer 308, peer 314 establishes communication using the available pipe.

Virtual Transport Layer Security 222

Figure 4:
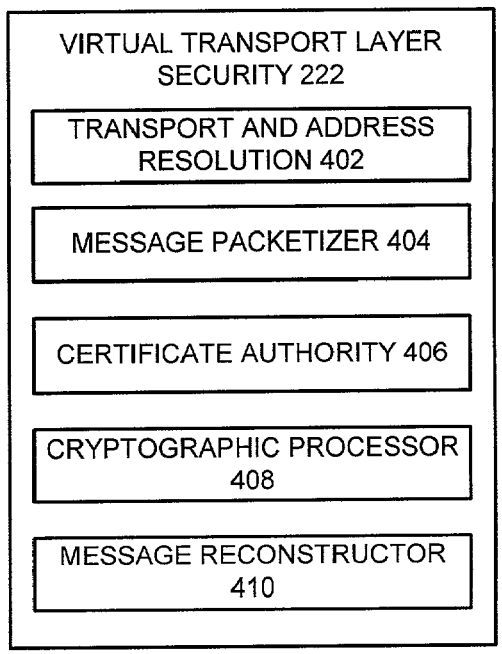
FIG. 4 illustrates virtual transport layer security 222 in accordance with an embodiment of the present invention.

FIG. 4 illustrates virtual transport layer security 222 in accordance with an embodiment of the present invention. Transport layer security 222 includes transport and address resolution 402, message packetizer 404, certificate authority 406, cryptographic processor 408, and message reconstructor 410. Transport and address resolution 402 searches for an available pipe for communicating with a peer by searching the entries in rendezvous 316, and 318. Upon finding an available pipe, virtual transport layer security 222 establishes a virtual connection with the associated peer.

Message packetizer 404 receives records from cryptographic processor 408 of up to a specified maximum length, for example 16K bytes. Each record is identified, and placed in a binary message so that the full message can be reassembled in proper order at the destination.

Certificate authority 406 provides signature services for virtual transport layer security 222. Certificate authority 406 operates in a manner similar to a certificate authority in the public key infrastructure (PKI). Since the PKI and certificates are well known in the art, no further discussion of certificates and certificate authority 406 will be included herein.

Cryptographic processor 408 provides cryptographic services to virtual transport layer security 222. These services are in the current implementation of SSL.V3 and the Internet Transport Layer Security. As such, these services include asymmetric key cryptography such as RSA or DSS to provide digital signatures and to provide a session key for symmetric key encryption and decryption of data. Symmetric key encryption can include 3DES, RC4, and AES. Cryptographic processor 408 provides message authentication codes using secure hash functions such as MD5 and SHA1. Cryptographic processor 408 may receive an output message from an output pipe, and in this case will break the message into records of up to a maximum length, for example 16K bytes, which contain the encrypted data, and pass the encrypted data to message packetizer 404. Cryptographic processor 408 may receive correctly ordered records from message reconstructor 410, and will decrypt the data and pass the data to a receiving input pipe.

Message reconstructor 410 reconstructs incoming messages by ordering the incoming Project JXTA binary messages in sequence, extracting the cryptographic processor 408 records, and passing these records to cryptographic processor 408.

Creating a Pipe

Figure 5:
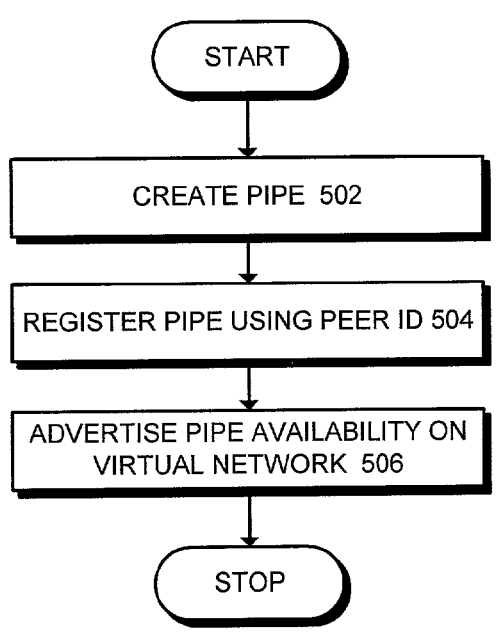
FIG. 5 is a flowchart illustrating the process of making a pipe available in accordance with an embodiment of the present invention.

FIG. 5 is a flowchart illustrating the process of making a pipe available in accordance with an embodiment of the present invention. The system starts when an application, say application 116, creates pipe 118 (step 502). Next, peer 104 registers the pipe using peer ID 120 (step 504). Finally, peer 104 advertises the availability of pipe 118 by establishing an entry in a rendezvous, say rendezvous 318 (step 506).

Connecting to a Pipe

Figure 6:
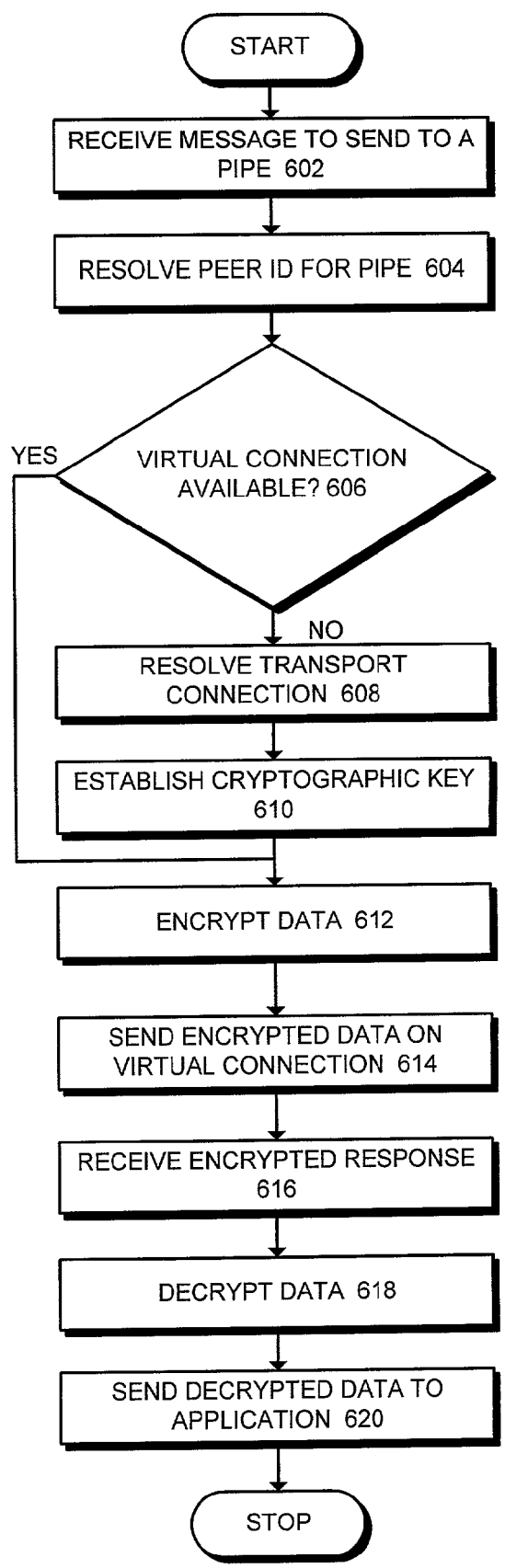
FIG. 6 is a flowchart illustrating the process of connecting to a pipe to send a message to a peer in accordance with an embodiment of the present invention.

FIG. 6 is a flowchart illustrating the process of connecting to a pipe to send a message to a peer in accordance with an embodiment of the present invention. The system starts when an endpoint, say endpoint 110 receives a message to send to a pipe on another peer (step 602). Next, endpoint 110 searches for an available pipe in rendezvous 316 and 318 (step 604). Endpoint 110 then determines if a virtual connection is already available for the peer (step 606).

If no virtual connection is available, VTLS 112 resolves the transport connection (step 608). Next, VTLS 112 establishes a cryptographic session key using a certificate generated by the owner of the pipe (step 610).

After establishing this cryptographic key or if a virtual connection is available at step 606, VTLS 112 encrypts the data using the session key (step 612). Next, VTLS 112 sends the encrypted data to the receiving peer over the virtual connection (step 614).

VTLS 112 may receive a reply from the peer on a registered input pipe (step 616). Upon receiving a reply, VTLS 112 decrypts the data (step 618). Finally, VTLS 112 sends the decrypted data to application 105 (step 620).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate virtual transport layer security on a virtual network, wherein the virtual network allows peer-to-peer communications, comprising:

creating a first pipe at a first peer, wherein a pipe is a one-way input channel into a peer, and wherein the peer is any type of computer system;

associating a first peer identifier with the first pipe;

advertising an availability of the first pipe, thereby allowing other peers to discover the first peer and to initiate secure direct peer-to-peer communications with the first peer;

connecting to the first pipe from a second peer;

creating a second pipe at the second peer;

associating a second peer identifier with the second pipe;

connecting to the second pipe from the first peer;

wherein the first pipe and the second pipe form a virtual connection between the first peer and the second peer; and initiating secure communications on the virtual connection between the first peer and the second peer without the assistance of a server, and by using an available underlying transport layer, wherein the transport layer does not require robust transport services.

2. The method of claim 1, further comprising:

creating a first set of pipes at the first peer, wherein the first set of pipes is associated with the first peer identifier;

creating a second set of pipes at the second peer, wherein the second set of pipes is associated with the second peer identifier;

connecting to the first set of pipes from the second peer; and connecting to the second set of pipes from the first peer;

whereby the first set of pipes and the second set of pipes share the virtual connection.

3. The method of claim 1, further comprising:

establishing a first certificate authority at the first peer; and establishing a second certificate authority at the second peer;

wherein the first certificate authority and the second certificate authority can issue certificates that facilitate privacy, authentication, integrity, and non-repudiation.

4. The method of claim 1, further comprising encrypting data that is transferred across the virtual connection.

5. The method of claim 4, wherein encrypting data involves using an available encryption engine.

6. The method of claim 5, further comprising using an available secure hash function to generate a message authentication code, wherein the message authentication code provides message integrity.

7. The method of claim 1, wherein advertising the availability of the first pipe involves registering the first pipe with a rendezvous.

8. A computer-readable storage medium storing instructions that when executed by a computer cause the computer to perform a method to facilitate virtual transport layer security on a virtual network, wherein the virtual network allows peer-to-peer communications, comprising:

creating a first pipe at a first peer, wherein a pipe is a one-way input channel into a peer, and wherein the peer is any type of computer system;

associating a first peer identifier with the first pipe;

advertising an availability of the first pipe, thereby allowing other peers to discover the first peer and to initiate secure direct peer-to-peer communications with the first peer;

connecting to the first pipe from a second peer;

creating a second pipe at the second peer;

associating a second peer identifier with the second pipe;

connecting to the second pipe from the first peer;

wherein the first pipe and the second pipe form a virtual connection between the first peer and the second peer; and initiating secure communications on the virtual connection between the first peer and the second peer without the assistance of a server, and by using an available underlying transport layer, wherein the transport layer does not require robust transport services.

9. The computer-readable storage medium of claim 8, the method further comprising:

creating a first set of pipes at the first peer, wherein the first set of pipes is associated with the first peer identifier;

creating a second set of pipes at the second peer, wherein the second set of pipes is associated with the second peer identifier;

connecting to the first set of pipes from the second peer; and connecting to the second set of pipes from the first peer;

whereby the first set of pipes and the second set of pipes share the virtual connection.

10. The computer-readable storage medium of claim 8, the method further comprising:

establishing a first certificate authority at the first peer; and establishing a second certificate authority at the second peer;

wherein the first certificate authority and the second certificate authority can issue certificates that facilitate privacy, authentication, integrity, and non-repudiation.

11. The computer-readable storage medium of claim 8, the method further comprising encrypting data that is transferred across the virtual connection.

12. The computer-readable storage medium of claim 11, wherein encrypting data involves using an available encryption engine.

13. The computer-readable storage medium of claim 12, the method further comprising using an available secure hash function to generate a message authentication code, wherein the message authentication code provides message integrity.

14. The computer-readable storage medium of claim 8, wherein advertising the availability of the first pipe involves registering the first pipe with a rendezvous.

15. An apparatus to facilitate virtual transport layer security on a virtual network, wherein the virtual network allows peer-to-peer communications, comprising:

a creating mechanism that is configured to create a first pipe at a first peer, wherein a pipe is a one-way input channel into a peer, and wherein the peer is any type of computer system;

an associating mechanism that is configured to associate a first peer identifier with the first pipe;

an advertising mechanism that is configured to advertise an availability of the first pipe, thereby allowing other peers to discover the first peer and to initiate secure direct peer-to-peer communications with the first peer;

a connecting mechanism that is configured to connect to the first pipe from a second peer;

wherein the creating mechanism is further configured to create a second pipe at the second peer;

wherein the associating mechanism is further configured to associate a second peer identifier with the second pipe;

wherein the connecting mechanism is further configured to connect to the second pipe from the first peer;

wherein the first pipe and the second pipe form a virtual connection between the first peer and the second peer; and an initiating mechanism that is configured to initiate secure communications on the virtual connection between the first peer and the second peer without the assistance of a server, and by using an available underlying transport layer, wherein the transport layer does not require robust transport services.

16. The apparatus of claim 15, wherein the creating mechanism is further configured to create a first set of pipes at the first peer, wherein the first set of pipes is associated with the first peer identifier;

wherein the creating mechanism is further configured to create a second set of pipes at the second peer, wherein the second set of pipes is associated with the second peer identifier;

wherein the connecting mechanism is further configured to connect to the first set of pipes from the second peer; and wherein the connecting mechanism is further configured to connect to the second set of pipes from the first peer;

whereby the first set of pipes and the second set of pipes share the virtual connection.

17. The apparatus of claim 15, further comprising:

an establishing mechanism that is configured to establish a first certificate authority at the first peer;

wherein the establishing mechanism is further configured to establish a second certificate authority at the second peer; and wherein the first certificate authority and the second certificate authority can issue certificates that facilitate privacy, authentication, integrity, and non-repudiation.

18. The apparatus of claim 15, further comprising an encrypting mechanism that is configured to encrypt data that is transferred across the virtual connection.

19. The apparatus of claim 18, wherein encrypting data involves using an available encryption engine.

20. The apparatus of claim 19, further comprising a generating mechanism that is configured to generate a message authentication code, wherein the message authentication code provides message integrity using a secure hash function.

21. The apparatus of claim 15, further comprising an advertising that is configured to advertise the availability of the first pipe by registering the first pipe with a rendezvous.

* * * * *